US011556006B2

(12) United States Patent
Wang et al.

(10) Patent No.: US 11,556,006 B2
(45) Date of Patent: Jan. 17, 2023

(54) METHOD AND DEVICE FOR DETECTING A SHADOW IN A HEAD MOUNTED DEVICE

(71) Applicant: Tobii AB, Danderyd (SE)

(72) Inventors: Yimu Wang, Danderyd (SE); Ylva Björk, Danderyd (SE); Joakim Zachrisson, Danderyd (SE); Pravin Kumar Rana, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/666,025

(22) Filed: Oct. 28, 2019

(65) Prior Publication Data
US 2020/0133003 A1 Apr. 30, 2020

(51) Int. Cl.
*G02B 27/01* (2006.01)

(52) U.S. Cl.
CPC .... *G02B 27/0172* (2013.01); *G02B 2027/014* (2013.01); *G02B 2027/0138* (2013.01)

(58) Field of Classification Search
CPC .................................................. G02B 27/0172
See application file for complete search history.

(56) References Cited

U.S. PATENT DOCUMENTS

| | | | | |
|---|---|---|---|---|
| 5,739,913 A | * | 4/1998 | Wallace | G03F 7/70733 |
| | | | | 356/401 |
| 7,522,344 B1 | * | 4/2009 | Curatu | G02B 27/0093 |
| | | | | 359/634 |
| 2009/0184845 A1 | * | 7/2009 | Saito | G06V 20/58 |
| | | | | 340/937 |
| 2011/0211056 A1 | * | 9/2011 | Publicover | H04N 5/2354 |
| | | | | 348/78 |
| 2013/0141434 A1 | | 6/2013 | Sugden et al. | |
| 2013/0147826 A1 | | 6/2013 | Lamb | |
| 2014/0253512 A1 | * | 9/2014 | Narikawa | G06F 3/0425 |
| | | | | 345/175 |
| 2015/0035832 A1 | * | 2/2015 | Sugden | G02B 27/0172 |
| | | | | 345/426 |
| 2015/0326570 A1 | * | 11/2015 | Publicover | H04N 5/247 |
| | | | | 726/4 |

(Continued)

OTHER PUBLICATIONS

Swedish Search Report regarding SE App. No. 1851344-0, dated May 14, 2019.

(Continued)

*Primary Examiner* — William Boddie
*Assistant Examiner* — Andrew B Schnirel
(74) *Attorney, Agent, or Firm* — Kilpatrick Townsend & Stockton LLP

(57) ABSTRACT

Disclosed is a method for detecting a shadow in an image of an eye region of a user wearing a Head Mounted Device, HMD. The method comprises obtaining, from a camera of the HMD, an image of the eye region of the user wearing a HMD and determining an area of interest in the image, the area of interest comprising a plurality of subareas. The method further comprises determining a first brightness level for a first subarea of the plurality of subareas and determining a second brightness level for a second subarea of the plurality of subareas. The method further comprises comparing the first brightness level with the second brightness level, and, based on the comparing, selectively generating a signal indicating a shadow.

20 Claims, 4 Drawing Sheets

(56) References Cited

U.S. PATENT DOCUMENTS

| | | | |
|---|---|---|---|
| 2016/0034019 A1* | 2/2016 | Seo | H04N 5/63 |
| | | | 345/593 |
| 2016/0125644 A1 | 5/2016 | James et al. | |
| 2017/0091535 A1 | 3/2017 | Yu et al. | |
| 2017/0278122 A1 | 9/2017 | Kaehler | |
| 2017/0343809 A1* | 11/2017 | Benesh | G09G 5/00 |
| 2018/0101223 A1* | 4/2018 | Ishihara | G06T 19/006 |

OTHER PUBLICATIONS

Extended European Search Report regarding EPO App. No. 19205647.1-1207, dated Mar. 4, 2020.

Swedish Patent Office Action regarding SE App. No. 1851344-0, dated May 14, 2019.

Zhaofeng He et al.: "Toward Accurate and Fast Iris Segmentation for Iris Biometrics", IEEE Transactions on Pattern Analysis and Machine Intelligence, IEEE Computer Society, USA, vol. 31, No. 9, Sep. 1, 2009 (Sep. 1, 2009), pp. 1670-1684, XP011266635, ISSN: 0162-8828, DOI: 10.1109/TPAMI.2008.183.

Min-Quan Jing et al: "Novel face-detection method under various environments", Optical Engineering., vol. 48, No. 6, Jun. 1, 2009 (Jun. 1, 2009), p. 067202, XP055679207, Bellingham ISSN: 0091-3286, DOI: 10.1117/1.3156843.

* cited by examiner

METHOD AND DEVICE FOR DETECTING A SHADOW IN A HEAD MOUNTED DEVICE

CROSS-REFERENCES TO RELATED APPLICATIONS

This application claims priority to Swedish Application No. 1851344-0, filed Oct. 29, 2018; the content of which are hereby incorporated by reference.

TECHNICAL FIELD

The present disclosure relates generally to methods, systems and devices for detecting a shadow in an image of a user wearing a head mounted device, and especially for detecting a shadow in the eye region of a user.

BACKGROUND

Today, eye-tracking technology is used for various different applications, such as e.g. Virtual Reality, VR, or Augmented Reality, AR. In some applications where eye-tracking is used, including VR and AR applications, the user on whom the eye-tracking is performed is wearing a head mounted device, HMD. The HMD can in some cases have a display and can in these cases also be referred to as a head mounted display.

In order to perform eye-tracking on a user wearing a HMD, movement of the user's eyes, including at least the pupils, needs to be detected and analyzed. Tracking of the user's eye movements include detecting the pupil of a user, which may be done by using differences in contrast and brightness levels between the pupil and other parts of the eye of a user, particularly the iris of a user. However, depending on factors such as e.g. where the cameras for detecting the eye movement are mounted and where illuminators providing light are mounted, shadows can occur which make it more difficult to accurately detect the eye movements of a user due to the decrease in difference of contrast and/or brightness levels between the pupil and the surrounding parts of the eye region. This is especially a problem in the case where a shadow would appear that is in the same area as the pupil of a user.

Consequently, there exists a need for improvement when it comes to accurately tracking the eye movements of a user wearing a HMD, especially wherein the configuration of the HMD and/or the positioning of the HMD on a user is such that shadows appear in the eye region of a user.

SUMMARY

It is an object of the invention to address at least some of the problems and issues outlined above. An object of embodiments of the invention is to provide a device and a method which improves the quality and accuracy of eye-tracking for a user wearing a Head Mounted Device, HMD. It may be possible to achieve these objects, and others, by using methods, devices and computer programs as defined in the attached independent claims.

According to one aspect a method is provided for detecting a shadow in an image of an eye region of a user wearing a HMD. The method comprises obtaining, from a camera of the HMD, an image of the eye region of the user wearing a HMD and determining an area of interest in the image, the area of interest comprising a plurality of subareas. The method further comprises determining a first brightness level for a first subarea of the plurality of subareas and determining a second brightness level for a second subarea of the plurality of subareas. The method further comprises comparing the first brightness level with the second brightness level, and based on the comparing, selectively generating a signal indicating a shadow.

According to another aspect, a HMD is provided. The HMD comprises processing circuitry and a memory. The memory contains instructions executable by the processing circuitry, whereby the HMD is operative for obtaining, from a camera of the HMD, an image of the eye region of the user wearing a HMD. The HMD is further operative for determining an area of interest in the image, the area of interest comprising a plurality of subareas. HMD is further operative for determining a first brightness level for a first subarea of the plurality of subareas and determining a second brightness level for a second subarea of the plurality of subareas. The HMD is further operative for comparing the first brightness level with the second brightness level, and based on the comparing, selectively generating a signal indicating a shadow.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
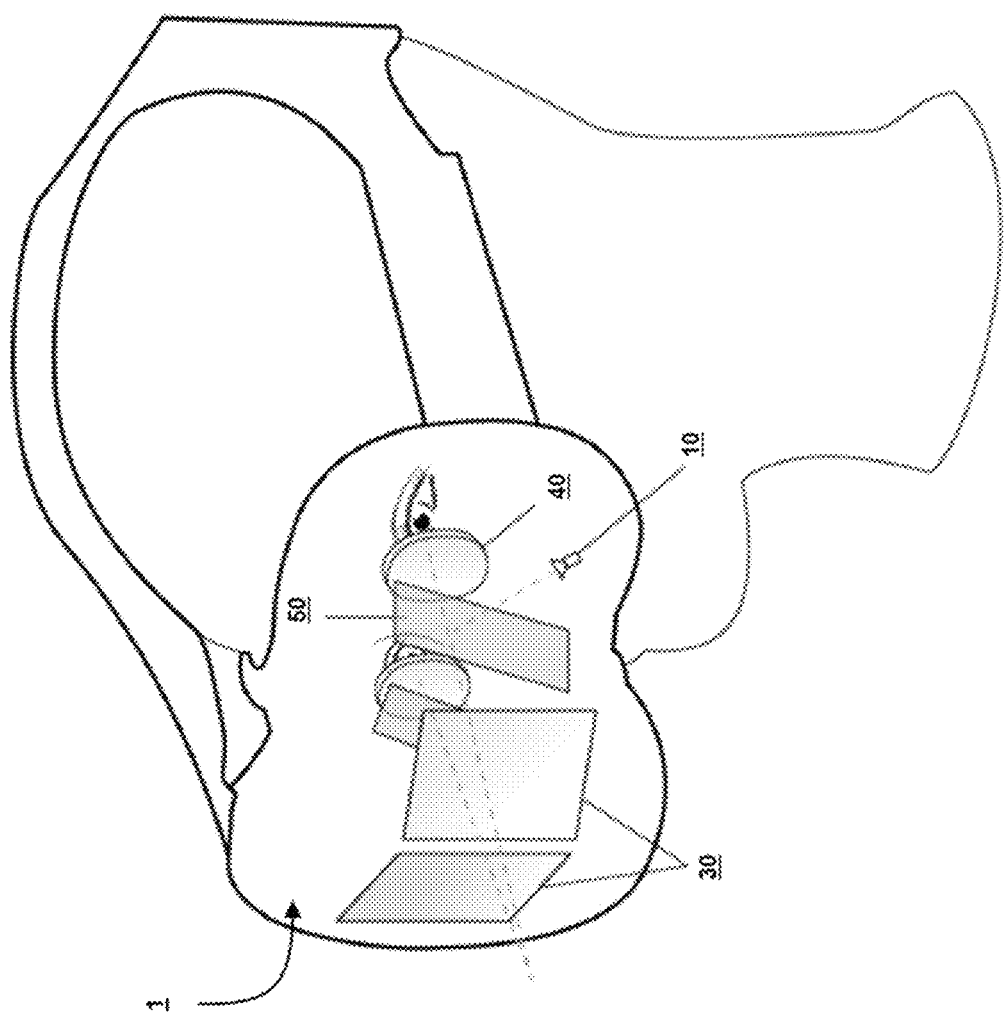
FIG. 1 shows a head mounted device according to an embodiment of the present disclosure.

Briefly described, a method for detecting a shadow in an eye region of a user wearing a Head Mounted Device, HMD, is provided, which improves the accuracy and the quality of eye-tracking that can be performed for the user of the HMD. In this patent application, shadow is defined as insufficient illumination for eye feature detection, such as detection of the pupil. The method comprises obtaining an image of the eye region of the user wearing the HMD and determining an area of interest in the image, wherein the area of interest comprises a plurality of subareas. The area of interest is in one embodiment the middle part of the eye region of a user, including at least the area surrounding and comprising the pupil. After obtaining the image, the method comprises determining a first brightness level for a first subarea, which in one embodiment is a subarea comprising at least the pupil of the user, which may also contain a shadow. The method further comprises determining a second brightness level for a second subarea, wherein the second subarea is in one embodiment an area not comprising the pupil of a user. The method further comprises comparing the first brightness level with the second brightness level and based on the comparing, selectively generating a signal indicating a shadow. In one embodiment the signal indicating a shadow is generated if the comparing indicates that there is a shadow, and no signal is generated of the comparing indicates that there is not a shadow. In one embodiment, the comparing indicates that there is a shadow if the difference in brightness levels for the first and second subareas is above a certain threshold, wherein the threshold may be predetermined or it may be adapted for the user wearing the HMD.

Methods for eye-tracking commonly use differences in contrast and brightness level in an image, typically at least between the iris and the pupil of a user, in order to determine where the pupil of a user is. An insight relevant to the present disclosure is that accurately detecting the location of the pupil of a user wearing a HMD can become difficult in case the HMD causes shadows to appear in the eye region of a user, especially when such shadows are located in the same area as the pupil of the user. A reason for shadows interfering with the eye-tracking capabilities of a HMD, especially when they are in the pupil area, is that they decrease the difference in brightness between the pupil area and the surrounding area, and this difference is often used in order to track the pupil. Shadows in a HMD often appear as vertical shadows, which may cover e.g. the middle of the eye region of the user, which is typically the area in which the pupil is most commonly located. Reasons for unwanted shadows appearing in the eye region include that HMDs often have illuminators placed at an angle in front of the eyes of the user. Preferably the illuminators are positioned on a frame surrounding a lens or a hole that during use of the HMD is positioned in front of the eyes or each of the eyes. The larger the lens or hole is, the higher the incidence angle would be of the light from the illuminators towards the eye(s). The higher the incidence angle is the higher the risk is that the eye will be shadowed. In cases where a HMD does produce shadows in the eye region of a user, this may result in worse conditions for eye-tracking. However, the problem can usually be solved by adjusting the position of the HMD. The position of the HMD can in some embodiments be adjusted by changing settings of the HMD, such as the settings of an eye-relief of the HMD, i.e. the distance between the eyes and the HMD. This distance may be a distance between each of the eyes and a respective lens of the HMD. In some embodiments, the HMD can be adjusted automatically by the HMD, and in some embodiments the user would need to manually adjust it after it has been indicated to the user that there is a shadow. By using methods, devices and computer programs according to the present disclosure, the accuracy and quality of eye-tracking can be improved by detecting a shadow covering the pupil of a user that would decrease the quality and accuracy of the eye-tracking, and selectively generating a signal to indicate a shadow in case one is detected.

FIG. 1 shows an example of a Head Mounted Device, HMD 1, which may be used in methods, devices and computer programs according to the present disclosure. As will be understood, the HMD 1 of FIG. 1 is merely an example, any HMD comprising or being capable of performing at least the features of the attached independent claims does fulfill the criteria of an HMD of the present disclosure. The HMD 1 comprises at least one camera 10, adapted to capture an image of the eye region of a user wearing the HMD. The camera 10 may be placed anywhere on or operatively connected to the HMD, as long as it is able to obtain an image of the eye region of a user wearing the HMD. Common placements of cameras 10 are in positions that would be in front of and slightly below the eye of a user when the user is wearing the HMD 1. In some embodiments, the HMD may comprise multiple cameras 10, for example there may be one camera 10 for each eye of the user. In some embodiments, the camera 10 may be mounted on a HMD 1 which was not manufactured with a camera 10 to start with. The HMD may also comprise illuminators (not shown) which are adapted to provide illumination of the eye region of a user wearing the HMD. The placement of the illuminators of a HMD may be relevant to whether a shadow is generated by the HMD 1 when a user is wearing the HMD, as well as HMD design and the characteristics and facial shape of the user wearing the HMD 1. The HMD 1 may optionally comprise at least one display 30. Further, the HMD 1 may comprise at least one lens 40. Further, in some embodiments the HMD 1 may optionally comprise at least one hot mirror 50. However, the hot mirror may be replaced by a holographic film or something completely different.

Figure 2:
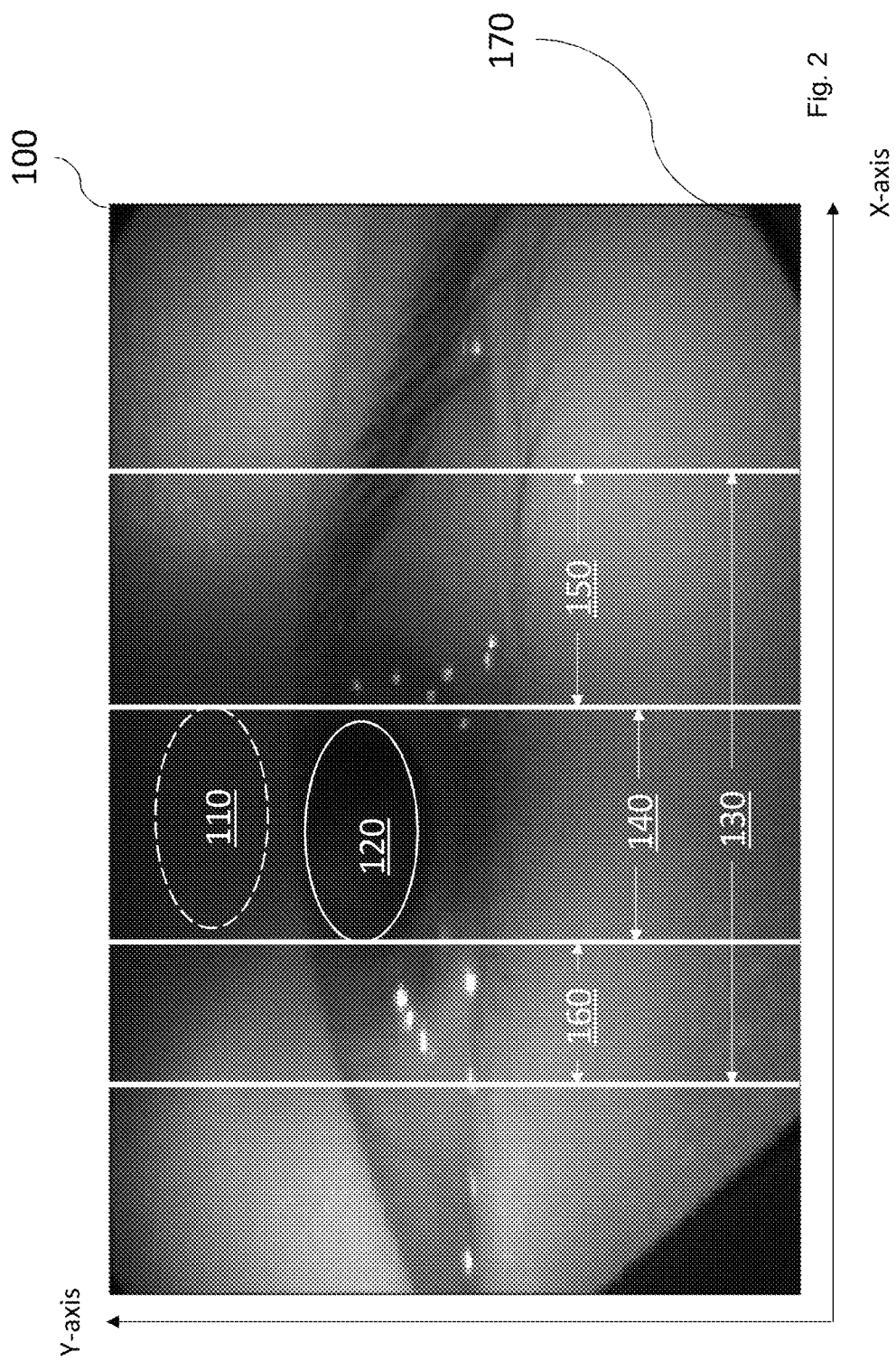
FIG. 2 shows an image of the eye region of a user of a HMD.

Looking now at FIG. 2, an image 100 of an eye region of a user is shown. The image is typically obtained from a camera of the HMD 1. The camera of the HMD 1 may be a camera contained in, mounted on or operatively connected to the HMD, and may also be obtained by a camera mounted on the HMD which was not a part of the HMD as manufactured. The image 100 comprises a plurality of pixels, which may be seen as a plurality of vertical columns of pixels, extending along the Y-axis of the image 100, and a plurality of horizontal rows of pixels, extending along the X-axis of the image 100. The image 100 comprises an area of interest 130, wherein the area of interest is in in one embodiment an area surrounding and comprising the pupil 120 of the user. In some embodiments, the area of interest may be predetermined as a certain part of the image 100, for example the middle 50% of the image. In some embodiments, the area of interest may be dynamically determined, for example by using image recognition technology on images obtained of the eye region of a user in order to determine which area comprises the area surrounding and comprising the pupil 120 of a user. If a shadow is present in an image, such as the shadow covering the middle part of the image 100 of FIG. 2, it may become difficult to accurately detect the location of the pupil 120 of the user. This can result in, for example, that a pupil is erroneously determined to be located at a position 110 which is not the actual position of the pupil 120.

When looking to detect a shadow in an image 100 of an eye region of a user, the difference in brightness level between different subareas of the image may be used. A first subarea 140 is in one embodiment chosen as a part of the image comprising at least the pupil of the user, and a second subarea 150, 160 is chosen as a part of the image not comprising the pupil. Due to the pupil being black, the subarea 140 comprising the pupil is expected to have a lower brightness level than the subarea 150, 160 not comprising the pupil. Further, if there is a shadow present in the subarea 140 comprising the pupil, and no shadow or less shadow is present in the subarea 150, 160 not comprising the pupil, the difference in brightness level between the first subarea 140 and the second subarea 150, 160 is larger than in cases where there is no shadow in the pupil area of a user. By looking at the differences in brightness values in an image of an eye region of a user of a HMD, such as the difference between the highest brightness value and the lowest brightness value of the image, and comparing these differences with differences in images of eye regions with no shadows present, it can be determined whether there is a shadow in an image, or if there is likely to be a shadow in an image. This insight is used in the present disclosure to determine whether there is a shadow in the first subarea 140.

Figure 3:
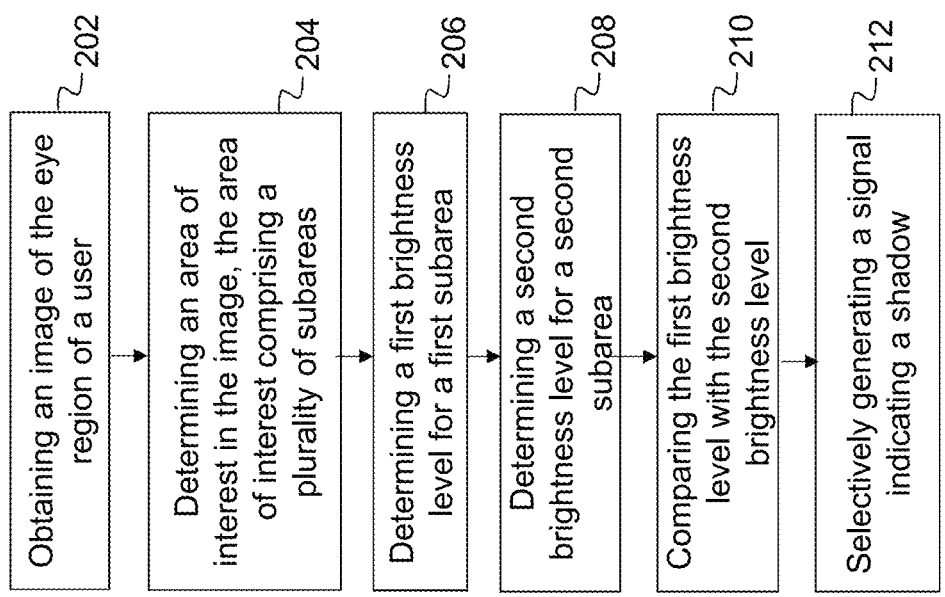
FIG. 3 is a flow chart schematically showing method steps of an embodiment of a method according to the present disclosure.

FIG. 3, in conjunction with FIGS. 1 and 2, shows an embodiment of a method for detecting a shadow in the eye region of a user wearing a HMD 1, wherein the HMD 1 comprises a camera 10. The method may in some embodiments be performed by the HMD 1, and in some embodiments the method may be performed elsewhere using data obtained from the HMD 1, for example in a cloud environment to which the HMD 1 is operatively connected. The method comprises obtaining 202 an image of an eye region of a user wearing the HMD 1. The method further comprises determining 204 an area of interest 130 in the obtained image, wherein the area of interest 130 comprises a plurality of subareas. The method further comprises determining 206 a first brightness level for a first subarea 140 of the image. The first subarea 140 may for example be one or more columns of pixels of the image, or one or more rows of pixels of the image. In some embodiments, the first subarea 140 is the area comprising the lowest brightness value in the image, which is typically the area comprising 140 the pupil of the user, wherein the brightness value is lower if the first subarea 140 comprises a shadow than if the first subarea 140 does not comprise a shadow. The method further comprises determining 208 a second brightness level for a second subarea 150, 160 of the image. The second subarea 150, 160 may for example be one or more columns of pixels of the image, or one or more rows of pixels of the image. In some embodiments, the second subarea 150, 160 is an area having the highest brightness value in the image, which is typically an area not comprising the pupil of a user. In some embodiments, the first subarea 140 is adjacent to the second subarea 150, 160. The method further comprises comparing 210 the first brightness level with the second brightness level, and based on the comparing, selectively generating 212 a signal indicating a shadow. In some embodiments, selectively generating 212 a signal comprises generating a signal in case the comparing is above a certain threshold and not generating a signal in case the comparing is below a certain threshold.

In some embodiments, the step of obtaining 202 an image of the eye region of a user comprises that a camera 10 of the HMD 1 captures an image of the eye region of a user wearing the HMD. In some embodiments, obtaining 202 an image of the eye region of a user comprises obtaining multiple images from different cameras, and combining the multiple images into one image. In some embodiments, obtaining 202 an image of the eye region of a user comprises obtaining multiple images from the same camera, and combining the multiple images into one image. The obtained image 100 is in a preferred embodiment a picture in black and white, and the step of obtaining 202 an image of the eye region of a user may in some embodiments include converting a captured image into black and white.

In some embodiments, the area of interest may be the entire image 1. In some embodiments, the area of interest may be the area surrounding and comprising the pupil of a user. In some embodiments, the size and/or position of the area of interest may be predetermined, and in some embodiments the area of interest may be dynamically determined, for example the area of interest may be determined in a user-specific way. In some embodiments, the step of determining 204 an area of interest 130 in the image 100 comprises choosing a number of columns of pixels corresponding to the middle 50% of the image. In some embodiments, determining 204 an area of interest 130 in the image 100 comprises choosing a number of columns of pixels corresponding to the area in which the pupil of the user is located. In some embodiments, determining 204 an area of interest 130 in the image 100 comprises choosing a number of columns of pixels corresponding to the area in which the entire eye of the user is located. The area of interest may be virtually any part of the obtained image, but it is typically an area comprising at least the area surrounding and comprising the pupil of the user. In some embodiments, determining an area of interest is done in order to exclude parts of the image which has constant dark pixels, denoted as 170 in FIG. 2, which may be caused by e.g. lens cups of the HMD. In some embodiments, determining an area of interest comprises excluding all parts of the image containing a dark group of pixels 170 which are in the periphery of the image.

In some embodiments, determining 206 a first brightness level for a first subarea 140 of the image and/or determining 208 a second brightness level for a second subarea 150, 160 of the image, comprises measuring and/or determining the brightness levels of the pixels in the first and second subarea 150, 160s, respectively. In one embodiment, the first subarea 140 is chosen as an area comprising the darkest part of the image, i.e. a part with the lowest brightness value. The second subarea 150, 160 is in one embodiment chosen as an area comprising the brightest part of the image, i.e. a part with the highest brightness value. In some embodiments, the first and second subareas are chosen such that the first subarea 140 has a lower brightness value than the second subarea 150, 160. The brightness value may in some embodiments be measured by calculating vertical projections of the image, wherein a vertical projection is the sum of pixel intensity values in a subarea, calculated as a column from the top the bottom. The pixel intensity values may in some embodiments range from 0 to 255, wherein 0 denotes black and 255 denotes white in a black and white image. In some embodiments, measuring the brightness value may further comprise calculating a pixel intensity value for the first subarea 140, which may be expressed as e.g. an average pixel intensity value or as a total pixel intensity value. As will be understood, this can be done in various ways, e.g. by summing up the pixel intensity value for each individual pixel in the first subarea 140 and then optionally dividing it by the number of pixels in the first subarea 140. In some embodiments, the vertical projections may be calculated as follows, wherein the image has a width=m and a height=n, and wherein the vertical projection is a vector of size m:

$$\text{vertical\_projection}[i] = \Sigma_{j=0}^{n-1} \text{pixel}(i,j)$$

In some embodiments, determining the brightness level of a subarea is based on brightness levels measured and/or recorded over a period of time. By basing the brightness value on values measured over time, it becomes easier to eliminate noise in the image, such as e.g. reflections. If a series of images are captured of the same eye region of a user wearing the HMD over time, the vertical projection of one area, such as the x:th column in one image, should correspond to the same area of the user's eye as the x:th column in another image of the same eye region. In some embodiments, the brightness level of an area is determined as the average brightness value of the series of images taken over time. In some embodiments, the brightness level of a subarea is determined as the maximum brightness value of the series of images taken over time. In some embodiments, the brightness level of an area is determined as the minimum brightness value of the series of images taken over time. By using the maximum and/or minimum brightness level of a series of images recorded over time, it becomes possible to eliminate noise caused by e.g. the eye moving around. Since shadow detection is typically based on differences in brightness levels, and the pupil of a user is dark, the difference in brightness levels between two subareas change if the pupil of the user moves. However, the shadow would generally be constant, which entails that the brightness level for a subarea comprising a shadow is always low, but outside of the shadow the brightness level would only be low in some eye positions, which would not be constant, at least not in cases where the shadow is located in the area comprising the pupil of a user.

Always keeping a maximum value for a subarea, for example keeping a maximum value for each vertical projection, could result in that the method still indicates that there is a shadow even after the HMD is adjusted such that the shadow disappears. This may be solved by, in some embodiments, keeping the maximum value for each subarea, but also having those maximum values decay over time, and always using the highest recorded value of the most recently recorded value and the most recent maximum with a decay applied. In some embodiments, the maximum value decays with 5% for each frame, in an implementations where 90 frames per second are obtained.

In some embodiments where a series of images is recorded over time, the method may also comprise using a filter for determining whether a shadow is present or not. A filter may be implemented such that a certain percentage of the most recently recorded images need to indicate that there is a shadow, in order for the method to generate a signal indicating that there is a shadow. In some embodiments, the method needs to indicate that there is a shadow present for 75/100 of the most recently recorded images in order for the method to indicate that there is a shadow. By applying such a filter, the effect of quick variations in shadow and brightness caused by e.g. moving the eyes around, moving the HMD around, adjusting the illuminators, etc., can be decreased and/or eliminated.

In some embodiments, the method further comprises, prior to determining 204 an area of interest 130 in the image 100, defining a region of interest of the image, and also determining if the area of interest 130 is within the region of interest. In some embodiments, the subsequent steps are then only performed in the area of interest 130 is determined to be within the region of interest. The region of interest may in some embodiments be the entire image. The region of interest may in some embodiments be the area in which the pupil of the user is expected to be, which may be predetermined or user-specific. In some embodiments, where the pupil is expected to be is based on previously acquired images from the same user, and in some embodiments it is based on images acquired from other users than the user currently using the HMD.

In some embodiments, the method may further comprise a step of determining if a shadow is likely to appear as a horizontal shadow or a vertical shadow. Such information may be used e.g. such that vertical projections are used for determining brightness values in case a vertical shadow is expected, and horizontal projections are used for determining brightness values in case a horizontal shadow is expected. Calculating horizontal projections would then be done in the same was as for the vertical projections as described above, but instead of summing the pixels from top to bottom for each column, the pixels are summed from left to right for each row. Determining if a shadow is likely to appear as a horizontal shadow or a vertical shadow may comprise analyzing a number of images taken over time and detecting if and where a shadow is located in those images, and then determining that a shadow is most likely to appear in the same direction as in those images.

In some embodiments, comparing the first brightness level with the second brightness level comprises comparing the brightness level of the pixels of the first subarea 140 with the brightness level of the pixels of the second subarea 150, 160. In some embodiments, the brightness levels of the pixels in a subarea correspond to the vertical projections of that subarea, as defined above. In some embodiments, the comparing comprises subtracting the total or average pixel intensity value of the first subarea 140 from the total or average pixel intensity value of the second subarea 150, 160. In some embodiments, the comparing 210 comprises applying a function over the first and second brightness levels. Such a function may be any kind of function, such as a transform.

In some embodiments, the step of selectively generating 212 a signal indicating a shadow comprises generating a signal if the comparing indicates that the difference between the first brightness value and the second brightness value is large enough. In practice, this would usually entail that the first subarea 140 is substantially darker than the second subarea 150, 160, which in turn would entail that it is likely that there is a shadow present in the first subarea 140. Determining that the difference between the first brightness level and the second brightness level is large enough may comprise comparing the difference with a predetermined threshold, and if the difference is above the threshold it is determined that the difference is large enough to generate a signal indicating a shadow, and if the difference is below the threshold no signal is generated. In some embodiments, the predetermined threshold is based on differences in brightness levels between first and second subareas of images where no shadow is present.

In some embodiments, the threshold level may be user-specific. In such cases, determining a user-specific threshold level may entail determining a brightness value for the user's eye region, which may in some embodiments be an average brightness value. In some embodiments, determining a user-specific threshold level may comprise determining brightness level(s) of one or more subareas of the image. In some embodiments, a function is applied over the brightness levels when determining a user-specific threshold. In some embodiments, the average brightness value for the user's eye region used for this threshold does not include the pupil and/or does not include the entire eye of the user. In some embodiments, the threshold may be based on a measure of the eye feature detection quality or eye feature detection performance. By taking the eye feature detection quality and/or performance into account, the threshold levels may for example be adapted such that devices with a higher performance/quality has a higher required threshold value than devices with a lower quality of the eye detection feature.

In some embodiments, the signal which may be generated in the step of selectively generating 212 a signal indicating a shadow, further comprises an instruction for adjustment of the HMD. The instruction may in some embodiments be an instruction to adjust the position of the HMD, which may include instructions for adjusting an eye-relief of the HMD. In some embodiments, the instruction may further comprise information regarding how the position of the HMD should be adjusted. Depending on the capabilities of the HMD, the instruction may be automatically executed by the HMD if such functionality exists, and if no HMD functionality exists for automatically adjusting the HMD, then the instruction may be intended as information to the user of the HMD, such that the user can determine what to do based on the instruction. In some embodiments, the instruction may comprise information regarding how to reposition and/or readjust illuminators of the HMD.

In some embodiments, the method may further comprise determining a third brightness level for a third subarea, and the comparing 210 may further comprise comparing the third brightness level with the first and second brightness levels.

Figure 4:
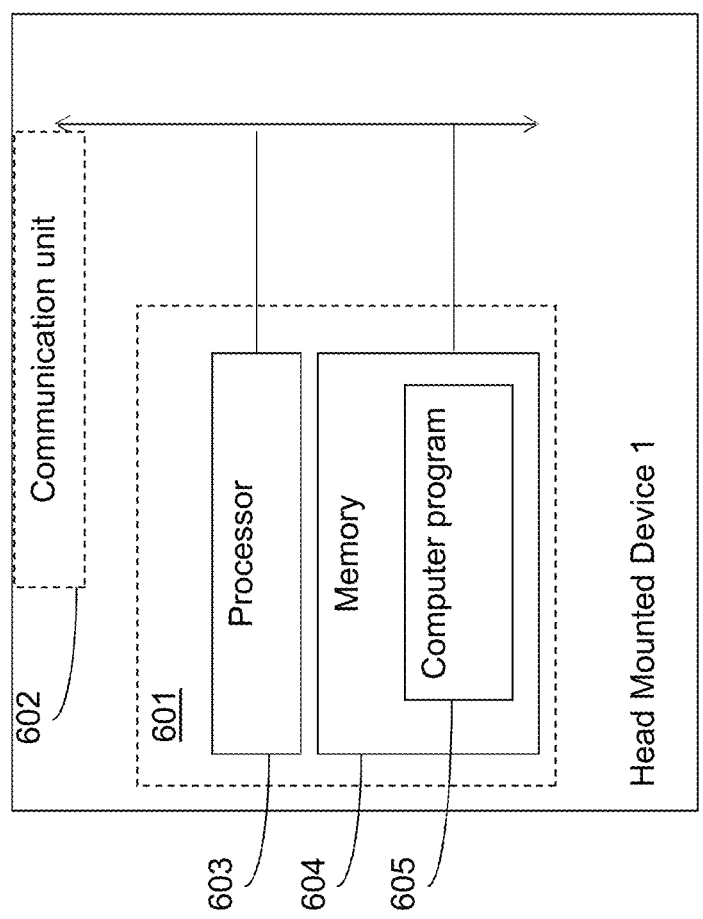
FIG. 4 shows a block schematic of a head mounted display according to an embodiment.

FIG. 4, in conjunction with FIG. 1, shows a HMD 1, capable of performing eye-tracking on a user wearing the HMD 1. The HMD 1 comprises processing circuitry 603 and a memory 604. The processing circuitry 603 may comprise one or more programmable processor, application-specific integrated circuits, field programmable gate arrays or combinations of these (not shown) adapted to execute instructions. The memory contains instructions executable by said processing circuitry, whereby the HMD 1 is operative for obtaining, from a camera of the HMD, an image of the eye region of the user wearing the HMD 1. The HMD 1 is further operative for determining an area of interest in the image, wherein the area of interest comprises a plurality of subareas. The HMD 1 is further operative for determining a first brightness level for a first subarea of the plurality of subareas, and determining a second brightness level for a second subarea of the plurality of subareas. The HMD 1 is further operative for comparing the first brightness level with the second brightness level, and based on the comparing, selectively generating a signal indicating a shadow.

According to an embodiment, the first subarea is a subarea having a higher brightness level than other subareas, and may be the subarea with the highest brightness level. In some embodiments, the second subarea is a subarea having a lower brightness level than other subareas, and may be the subarea with the lowest brightness level.

According to an embodiment, the comparing comprises subtracting the first brightness level from the second brightness level.

According to an embodiment, the signal which is selectively generated comprises an instruction for adjustment of the HMD. The instruction may be an instruction for the HMD 1 or for a user of the HMD 1.

According to an embodiment, the steps of determining brightness levels for the first and second subareas is based on brightness levels recorded over a predetermined period of time.

According to an embodiment, the signal is generated if the comparing is above a threshold value. In some embodiments, no signal is generated if the comparing is below a threshold value.

According to an embodiment, the HMD 1 is further operative for applying a function over the first and second brightness levels, or one of them, before the comparing step.

According to an embodiment, determining a first brightness level for a first subarea of the plurality of subareas and determining a second brightness level for a second subarea of the plurality of subareas, comprises comparing the brightness levels of the pixels of the first and second subareas, respectively According to an embodiment, the image comprises a plurality of columns of pixels, and each subarea corresponds to one or more columns of pixels.

According to an embodiment the HMD 1 is further operative for, prior to determining an area of interest in the image defining a region of interest of the image, and for, after the determining an area of interest in the image, determining if the area of interest is within the region of interest. According to an embodiment, the subsequent steps are then only performed if the area of interest is within the region of interest.

According to an embodiment, the HMD 1 is further operative for determining a third brightness level for a third subarea, wherein the comparing further comprises comparing the third brightness level with the first and second brightness levels.

In some embodiments, the feature(s) of the HMD, e.g. the processing circuitry and the memory, which perform the method steps may be a group of network nodes, wherein functionality for performing the method are spread out over different physical, or virtual, nodes of the network. In other words, the feature(s) of the HMD which perform the method steps may be a cloud-solution, i.e. the feature(s) of the HMD which perform the method steps may be deployed as cloud computing resources that may be distributed in the network.

According to other embodiments, the HMD 1 may further comprise a communication unit 602, which may be considered to comprise conventional means for communicating with relevant entities, such as other computers or devices to which it is operatively connected. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in a HMD 1 causes the HMD 1 to perform the steps described in any of the described embodiments of the HMD 1. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the HMD, to which the HMD has access via the communication unit 602. The computer program may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for detecting a shadow in an image of an eye region of a user wearing a Head Mounted Device (HMD) comprising:
   obtaining, from a camera of the HMD, an image of the eye region of the user wearing the HMD;
   determining an area of interest in the image, wherein the area of interest comprises a plurality of columns of pixels corresponding to an area in the image in which an entire eye of the user is located;
   determining a first subarea within the area of interest, the first subarea comprising a first set of the columns of pixels having a first brightness level, wherein the first brightness level is calculated as a sum of pixel intensity values in the first set of the columns of pixels;
   determining a second subarea within the area of interest, the second subarea comprising a second set of the columns of pixels having a second brightness level, wherein the second brightness level is calculated as a sum of pixel intensity values in the second set of the columns of pixels;
   comparing the first brightness level with the second brightness level; and
   when the difference between the first brightness level and second brightness level is greater than a predetermined threshold, generating a signal indicating a presence of a shadow.

2. The method according to claim 1, wherein the first brightness level is the lowest brightness level in the area of interest, and the second brightness level is the highest brightness level in the area of interest.

3. The method according to claim 1, wherein the comparing comprises subtracting the first brightness level from the second brightness level.

4. The method according to claim 1, wherein said signal further comprises an instruction for adjustment of the HMD.

5. The method according to claim 1, wherein determining the first brightness level and the second brightness level is based on brightness levels recorded over a predetermined period of time.

6. The method according to claim 1, further comprising applying a function over the first brightness level and the second brightness level before the comparing.

7. The method according to claim 1, further comprising:
   prior to determining the area of interest in the image, defining a region of interest of the image; and
   after the determining the area of interest in the image, determining that the area of interest is within the region of interest.

8. The method according to claim 7, wherein the region of interest comprises an area in which a pupil of the user is expected to be based on analysis of previously acquired images of the eye region of the user.

9. The method according to claim 7, wherein the region of interest comprises an area in which a pupil of the user is expected to be based on analysis of previously acquired images of eye regions of other users.

10. The method according to claim 1, further comprising determining a third subarea within the area of interest, the third subarea comprising a third set of the columns of pixels having a third brightness level, wherein the third brightness level is calculated as a sum of pixel intensity values in the third set of the columns of pixels; and
   wherein the comparing further comprises comparing the third brightness level with the first brightness level and the second brightness level.

11. A head mounted device (HMD) adapted to be worn by a user, the HMD comprising:
   at least one camera;
   processing circuitry; and
   a memory, said memory containing instructions executable by said processing circuitry, whereby said HMD is operative for:
   obtaining, from a camera of the HMD, an image of the eye region of the user wearing the HMD;
   determining an area of interest in the image, wherein the area of interest comprises a plurality of columns of pixels corresponding to an area in the image surrounding and including a pupil of the user;
   determining a first subarea within the area of interest, the first subarea comprising a first set of the columns of pixels having a first brightness level, wherein the first brightness level is calculated as a sum of pixel intensity values in the first set of the columns of pixels;
   determining a second subarea within the area of interest, the second subarea comprising a second set of the columns of pixels having a second brightness level, wherein the second brightness level is calculated as a sum of pixel intensity values in the second set of the columns of pixels;
   comparing the first brightness level with the second brightness level; and
   when the difference between the first brightness level and second brightness level is greater than a predetermined threshold, generating a signal indicating a presence of a shadow.

12. The HMD according to claim 11, further comprising applying a function over the first brightness level and the second brightness level before the comparing.

13. The HMD according to claim 11, wherein the first brightness level is the lowest brightness level in the area of interest, and the second brightness level is the highest brightness level in the area of interest.

14. The HMD according to claim 11, further comprising: prior to determining an area of interest in the image, defining a region of interest of the image; and after the determining an area of interest in the image, determining that the area of interest is within the region of interest.

15. The HMD according to claim 14, wherein the region of interest comprises an area in which a pupil of the user is expected to be based on analysis of previously acquired images of the eye region of the user.

16. The HMD according to claim 14, wherein the region of interest comprises an area in which a pupil of the user is expected to be based on analysis of previously acquired images of eye regions of other users.

17. The HMD according to claim 11, further comprising determining a third subarea within the area of interest, the third subarea comprising a third set of the columns of pixels having a third brightness level, wherein the third brightness level is calculated as a sum of pixel intensity values in the third set of the columns of pixels; and
   wherein the comparing further comprises comparing the third brightness level with the first brightness level and the second brightness level.

18. A non-transitory computer readable medium storing instructions that, upon execution by a Head Mounted Device (HMD) cause the HMD to perform the following steps:
   obtaining, from a camera of the HMD, an image of the eye region of the user wearing a HMD;
   determining an area of interest in the image, wherein the area of interest comprises a plurality of columns of pixels corresponding to an area in the image surrounding and including a pupil of the user;

determining a first subarea within the area of interest, the first subarea comprising a first set of the columns of pixels having a first brightness level, wherein the first brightness level is calculated as a sum of pixel intensity values in the first set of the columns of pixels;

determining a second subarea within the area of interest, the second subarea comprising a second set of the columns of pixels having a second brightness level, wherein the second brightness level is calculated as a sum of pixel intensity values in the second set of the columns of pixels;

comparing the first brightness level with the second brightness level; and when the difference between the first brightness level and second brightness level is greater than a predetermined threshold, generating a signal indicating a presence of a shadow.

19. The non-transitory computer readable medium according to claim 18, wherein the first brightness level is the lowest brightness level in the area of interest, and the second brightness level is the highest brightness level in the area of interest.

20. The non-transitory computer readable medium according to claim 18, wherein the instructions, upon execution by the HMD, further cause the HMD to perform the step of determining a third subarea within the area of interest, the third subarea comprising a third set of the columns of pixels having a third brightness level, wherein the third brightness level is calculated as a sum of pixel intensity values in the third set of the columns of pixels; and wherein the comparing further comprises comparing the third brightness level with the first brightness level and the second brightness level.

* * * * *